W. A. TURBAYNE.
SYSTEM OF ELECTRICAL REGULATION.
APPLICATION FILED DEC. 23, 1910.
1,131,175.   Patented Mar. 9, 1915.
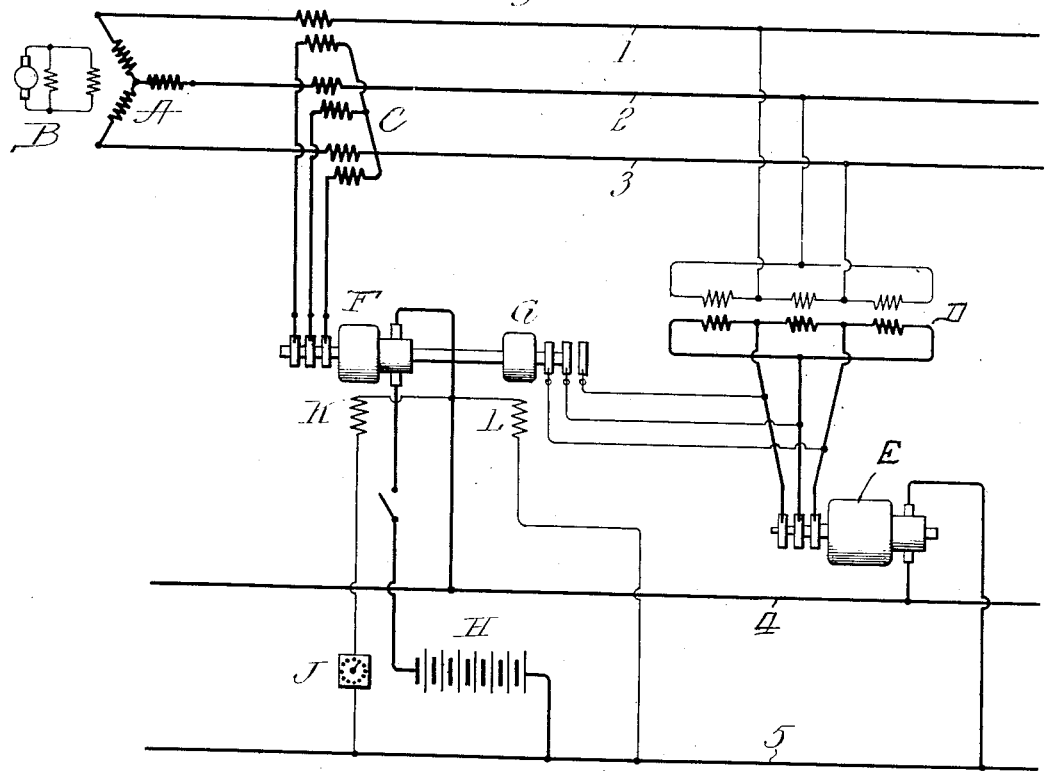
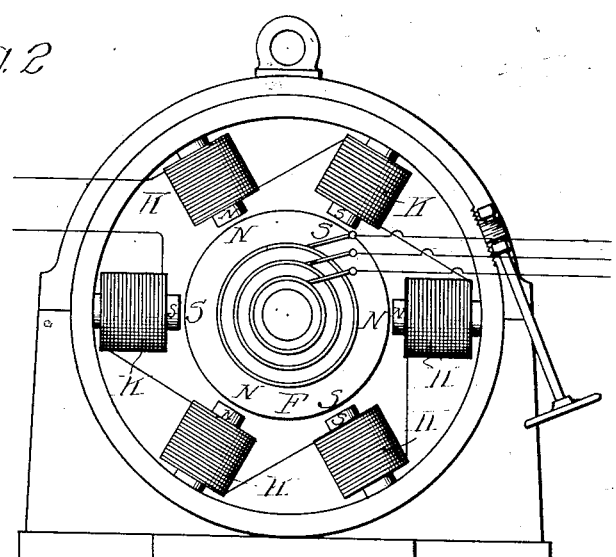

UNITED STATES PATENT OFFICE.

WILLIAM A. TURBAYNE, OF NIAGARA FALLS, NEW YORK, ASSIGNOR, BY MESNE ASSIGNMENTS, TO CENTRAL TRUST COMPANY OF NEW YORK, TRUSTEE, A CORPORATION OF NEW YORK.

SYSTEM OF ELECTRICAL REGULATION.

1,131,175.  Specification of Letters Patent.  Patented Mar. 9, 1915.

Application filed December 23, 1910. Serial No. 598,901.

*To all whom it may concern:*

Be it known that I, WILLIAM A. TURBAYNE, a citizen of the United States, residing at Niagara Falls, in the county of Niagara and State of New York, have invented new and useful Improvements in Systems of Electrical Regulation, of which the following is a full, clear, concise, and exact description, reference being had to the accompanying drawing, forming a part of this specification.

My invention relates to electrical systems of distribution and to regulating means therefor, in which a storage battery and booster are employed for steadying the load on an alternating current generating station supplying alternating and direct current distributing systems.

In prior systems in which regulation of this character has been undertaken by the use of a storage battery with a booster connected across the direct current side of a rotary converter station, the booster has been controlled by regulating apparatus responding to fluctuations in the alternating supply circuits and its operation has been such that, during periods of demand exceeding the desired generator output, the battery has been caused to discharge and take the overload, while a reduced demand has caused the battery to charge and, by these actions, to insure the maintenance of a substantially constant load on the generating equipment. In these systems, it has been the usual practice to supply current from series transformers which were included in the main lines undergoing regulation, to a special synchronous rectifying device which in turn supplied direct current to the field windings of the regulating booster in proportion to the variations in the main line current, whereby battery action was secured in the proper degree to minimize the main line fluctuations.

One of the objects of my present invention is to provide a system in which the battery may act to steady the load on an alternating current generator, and which may be efficiently and accurately regulated from the alternating current circuit, whether the working circuit is on the alternating current side of the system or on the direct current side, or whether there are work circuits on both sides of the system.

Another object is to secure the advantageous features of regulation of prior systems by a much simplified arrangement, in which the special rectifying device is dispensed with. This I accomplish by admitting the main line regulating component of current directly to the booster proper.

While various instrumentalities may be combined so as to secure the results enumerated, I have illustrated in the accompanying drawings one system which I consider embodies, in practical form, the main features of my invention.

Referring to the drawings:—Figure 1 illustrates, diagrammatically, the system as a whole. Fig. 2 illustrates one of the elements of the system.

In the drawings, A represents an alternating current generator having an exciter B and supplying three-phase current to the lines 1, 2 and 3. Transformers D are provided for supplying current at proper voltage to the rotary converter E, which in turn supplies direct current to the lines 4 and 5. Connected across the direct current system, is a storage battery H, having in series therewith the armature of a booster F. This booster is directly driven by a synchronous motor G, excited from the direct current lines by the winding L, this motor having the same number of magnetic poles as the booster F.

The booster is provided with collector rings connected with the armature winding at the proper points and its poles are provided with a shunt winding K excited from the direct current lines 4 and 5 and made capable of adjustment by any suitable means, such as the rheostat J.

Alternating current proportional to the main line current is admitted to the booster armature winding through collector rings from the current transformers C connected in the generator supply lines 1, 2 and 3. With the booster stationary, these alternating currents, circulating in the armature winding, would set up a magnetic flux which would rotate in synchronism with the main generator and at a speed determined by the pole pitch, but as the booster armature is revolved in the opposite direction by the synchronous motor G having the same pole pitch, the magnetic flux will be fixed in space and will have defined poles. In Fig. 2, this booster is illustrated as having poles defined as explained above and indicated by the letters N—S around the armature periphery. External poles with windings K, excited by direct current, as explained above, furnish a means for neutralizing the magnetic flux set up in the revolving armature, so that at any predetermined normal line load, the booster may be caused to produce zero voltage at its direct current brushes.

In operation, the action of this apparatus is as follows: Assuming that current representing the desired normal load is being supplied through the lines 1, 2 and 3, and that the magnetizing current, supplied by the series transformers C to the synchronously rotating booster F, is exactly neutralized in effect by the magnetizing current in the external fields K, no voltage will be developed at the booster brushes and the battery will neither charge nor discharge. Increase of current in lines 1, 2 and 3, accompanying increased demand, will cause transformers C to furnish a magneto-motive force preponderating over that imparted by the coils K so that an effective flux will result, causing a booster voltage in a direction to discharge the battery and thereby prevent the overload from falling upon the generator A. On the other hand, reduction of current in lines 1, 2 and 3 below normal will cause the excitation, imparted by coils K, to predominate and a booster voltage will be developed in a direction to cause a battery charge so that substantially normal load will be maintained upon the generator, this load departing from normal value only in sufficient degree to bring about the required booster excitation to cause proper battery action. If an overload should exist, by reason of increased demand on the direct current side of the system, the battery will directly supply the demand through lines 4 and 5. If the overload develops on the alternating current side of the system supplied from lines 1, 2 and 3, the battery will cause the converter E to invert and, discharging through the same, will furnish alternating current to take the overload.

In certain instances, advantage may be taken of the voltage developed across the series transformers C. For instance, with the normal line load, the voltage at the collector rings of booster F will be zero and the transformers C will behave exactly as if on short circuit, so that the minimum reactance voltage will exist across their primary windings included in lines 1, 2 and 3. With increase of current, however, a voltage will be developed accentuating the drop in voltage between generator and rotary converter, which reduction in voltage will assist in bringing about a battery discharge, while on the other hand, by reason of the booster excitation by windings K, any reduction of current through the series transformers C below normal will be accompanied by the development of a boosting voltage across these latter, tending to raise the rotary voltage and assist in bringing about a battery charge. In other words, these series transformers may be utilized to give the supply system a drooping characteristic upon increase of load, thereby favoring battery action.

I do not desire to limit myself to the details of the above described instrumentalities, nor to the relation of one to the other in the general form illustrated, as it is obvious that various changes may be made within the scope of the invention whereby the same desirable results may be secured in other ways.

What I claim as my invention and desire to secure by Letters Patent of the United States, is:—

1. In combination, an alternating current circuit, a direct current circuit supplied thereby, a battery connected across said direct current mains, and a booster in series with said battery, said booster having its armature connected directly to respond to variations of current in the alternating current circuit.

2. In combination, an alternating current circuit, a direct current circuit supplied thereby, a battery connected across the direct current mains and a booster in series with said battery, said booster having its field winding connected across the direct current mains and means for admitting the alternating main line regulating component of current to said booster.

3. In combination an alternating current circuit, a direct current circuit, means connecting said circuits and including a rotary converter, a battery connected across the direct current mains and a booster in series with said battery, said booster having its field winding connected across said direct current mains, and having means whereby current from said A. C. circuit may be admitted to said booster, said current acting to set up a field opposing said direct current field and tending to neutralize the same.

4. In combination, an alternating current circuit, a direct current circuit, connections between said circuits including a transformer and a rotary converter, a storage battery connected across said direct current circuit, a booster in series with said battery and a synchronous motor for driving said booster, said motor being connected with said transformer in parallel with said rotary converter, said booster having its field winding connected across said direct current circuit, and means for admitting a component of current from said alternating circuit to the armature of said booster to produce a flux rotating in a direction opposite to the rotation of said armature and at substantially the same speed, whereby said flux opposes the booster field causing said booster to produce a voltage which either assists said battery, opposes said battery or produces no voltage, depending on whether the booster field or said flux predominates.

5. In a system of distribution, in combination, an alternating current circuit including a generator, means for transmitting electrical energy from said alternating current circuit as direct current supplying a direct current circuit, a storage battery connected to said circuit, means associated with said battery for assisting or opposing the flow of current therefrom under varying conditions, and means for rendering said last means ineffective under normal working conditions, said last means being associated directly with said alternating current circuit.

6. In an electrical system of distribution, a source of three-phase alternating current, a circuit supplied thereby, a direct current circuit, a rotary converter connected between said circuits whereby one circuit may be supplied by the other, a storage battery connected across said direct current circuit, a booster connected in series with said battery to regulate the charge and discharge thereof, current transformers in the alternating current circuit, means for supplying the current from the secondaries of said transformers to the armature of said booster, thereby tending to set up a rotating flux, a synchronous motor for rotating said armature in a direction opposite to the rotation of said flux whereby said flux may be fixed in space with definite poles, and field windings for said booster energized from said direct current circuit, said windings creating field poles equal in number to and of opposite polarity to said fixed poles, whereby the E. M. F. of said booster armature may cause said battery to charge or discharge, depending on whether the flux set up by said alternating current or said direct current circuit predominates.

7. In a system of electrical distribution, an alternating current source of supply, an alternating current circuit supplied thereby, a direct current circuit, means whereby said direct current circuit is supplied from said alternating current circuit, a storage battery connected across said direct current circuit, and means for governing the charge and discharge of said battery, said means comprising a booster having an armature connected in series with said battery, means for admitting alternating current to said armature, said current tending to set up a rotating magnetic flux, means for rotating said armature in a direction opposite to the rotation of said flux and at the same rate of rotation, and a plurality of field windings energized from said direct current circuit, said field windings acting under predetermined conditions to neutralize said magnetic flux, whereby the direction and magnitude of the E. M. F. generated by said booster will depend on the predominance of said field over said magnetic flux or vice versa.

8. In a system of electrical distribution, an alternating current supply circuit, a direct current circuit, means whereby said direct current circuit is supplied by said alternating current circuit, a load-equalizing battery connected in said direct current circuit, and means for governing the charge and discharge of said battery, said means comprising a booster having an armature connected in series with said battery, direct current field windings energized from said direct current circuit, and means whereby current in the alternating current circuit may set up a magnetic flux opposed to said direct current field, whereby the polarity and voltage of said booster armature will depend on the predominance of said field over said flux or vice versa.

9. In an electrical system of distribution, an alternating current source supplying an alternating current circuit, a direct current circuit supplied from said alternating current circuit, a compensating battery in said direct current circuit, and a booster for regulating the charge and discharge of said battery, said booster having field windings energized from said direct current circuit and also having means whereby current from said alternating current circuit may be directly admitted to said booster to oppose said direct current field, whereby said booster will generate an E. M. F. depending in direction and magnitude on whether the field set up by said alternating current or said direct current circuit predominates.

In witness whereof, I have hereunto subscribed my name in the presence of two witnesses.

WILLIAM A. TURBAYNE.

Witnesses:
GEO. B. JONES,
E. R. KING.